DIVERSITY COMMUNICATION SYSTEM

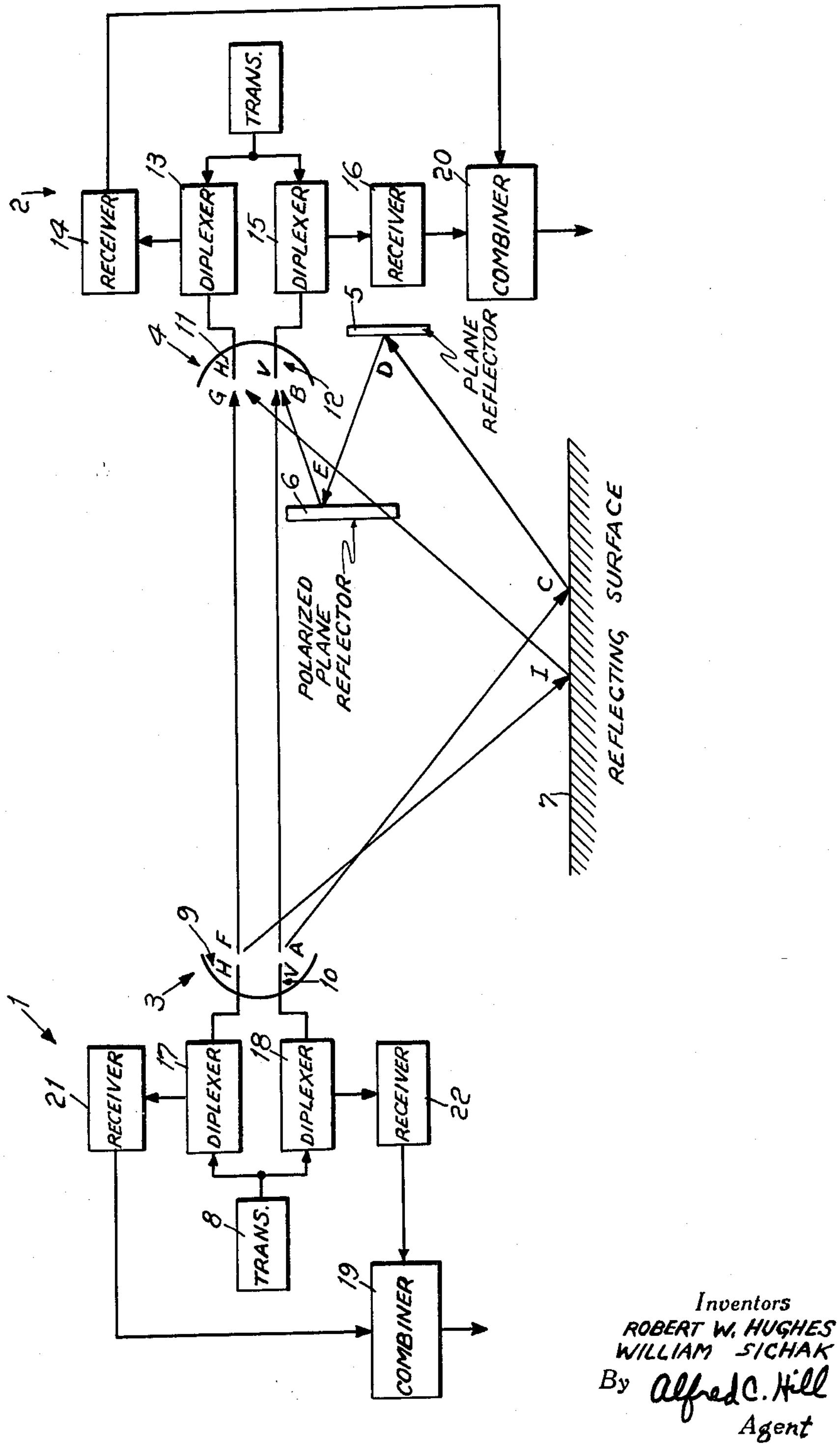
Inventors
ROBERT W. HUGHES
WILLIAM SICHAK
By Alfred C. Hill
Agent 2,979,716

Robert W. Hughes, Mountain Lakes, and William Sichak, Nutley, N.J., assignors to International Telephone and Telegraph Corporation, Nutley, N.J., a corporation of Maryland Filed Aug. 25, 1958, Ser. No. 756,993

18 Claims. (Cl. 343—100)

This invention relates to communication systems and more particularly to space diversity communication systems.

In many communication systems, a method of space diversity propagation is employed. By various means, this method provides a second transmission path for the signals so that when a fade occurs on the primary path, the secondary path will not simultaneously encounter fading. Very bad fades are often caused by a simple cancellation between the direct path and a reflected path normally reflecting from the earth's surface, such as land or water. If a secondary path is provided, exactly the same kind of cancellation fading will result on the secondary path. However, by properly positioning the secondary path, the fading can be made to occur non-simultaneously with the fading of the primary path. As a result, either the primary or the secondary path will always provide a usable signal at any given instant.

In the early diversity systems the secondary transmission path was provided by supplying an additional receiving antenna and receiver for each direction of transmission which as a necessity required four parabolic antennas. A more recent diversity systems requires only three parabolic antennas. In this more recent diversity system there are two terminals, one called an east terminal and the other called a west terminal. A single parabolic antenna is disposed at the east terminal and two parabolic antennas are disposed at the west terminal. At the west terminal the two antennas are used for normal diversity reception. For transmission in the opposite direction, however, the transmitter energy is split and one half of the energy is sent from each antenna, respectively, with vertical polarization and horizontal polarization. In this way two transmission paths are provided, and consequently the diversity advantage is achieved.

An object of this invention is to provide another form of diversity system.

Another object of this invention is to provide a diversity system which will greatly reduce the cost of diversity systems as compared to the systems of the prior art.

Still another object of this invention is the provision of a diversity communication system employing only two parabolic antennas, one at each end of the communication system.

A feature of this invention is the provision of a reflecting means disposed adjacent to one of the parabolic antennas disposed at each end of the communication system to provide a secondary radio path between said parabolic antennas to achieve the desired diversity advantage.

A further feature of this invention is the provision of a system for transmitting energy in one mode of propagation to provide the primary path between the parabolic antennas disposed at each end of the system and the transmission of the energy on a second mode of propagation to define a secondary path of propagation, said secondary path of propagation including a pair of plane reflectors at least one of which is polarized to reflect the second mode of propagation and to pass the first mode of propagation.

The above-mentioned and other features and objects of this invention and the manner of obtaining them will become more apparent by the reference to the following description taken in conjunction with the drawing, the single figure of which illustrates in block diagram form an embodiment of our invention.

Referring to the figure of this application, there is illustrated a diversity communication system including terminal 1 and terminal 2, which would be disposed at opposite ends of a communication system or a communication link. Terminal 1 includes a parabolic antenna 3 and terminal 2 includes a parabolic antenna 4. Hence the diversity communication system of this invention incorporates only two parabolic antennas, one disposed at each end of a communication system or communication link. Disposed adjacent one of the parabolic antennas is positioned a pair of reflectors 5 and 6, which will provide the secondary communication path between antennas 3 and 4, the spacing of these reflectors 5 and 6 with respect to antenna 4 being such as to provide a propagation path which is different from the primary path between antennas 3 and 4 whereby diversity advantage can be achieved, that is, the signals will not fade the same in the two radio wave paths. In the system of this invention the primary paths between antennas 3 and 4 are illustrated by the lines labeled FG and FIG wherein the path FIG is obtained by the radio wave being reflected from say the earth's surface, such as water or ground, as indicated at 7. In accordance with this invention, the secondary paths are indicated by the lines AB and ACDEB, the latter path including the plane reflectors 5 and 6. It should be noted that considerable freedom of location of reflectors 5 and 6 is possible, since it is only the total length of the path ACDEB which is important. Reflectors 5 and 6 may be located below antenna 4 as illustrated, or they may be located above, or on either side of antenna 4. One requirement in locating reflectors 5 and 6 is that they must be positioned such that the waves that are reflected from reflector 6 fully illuminate the antenna 4 so that the antenna will properly act upon and receive these signals.

With the lines illustrating the primary and secondary paths as illustrated, transmission is taking place from terminal 1 to terminal 2. To provide a two-way transmission, it is necessary for the energy from terminal 2 to be transmitted to terminal 1. It is still desirable to have a diversity advantage in this direction of communication and hence energy radiated from terminal 2 will follow substantially the same primary paths and substantially the same secondary paths in the reverse direction, reflectors 5 and 6 being included in one of the secondary paths to provide diversity advantage.

To assure the achievement of the diversity advantage, it is necessary to identify in some manner the energy which travels the primary and secondary paths so that receivers can act upon these two received signals to provide the desired diversity advantage. To accomplish this, it is intended that the energy following the primary paths be propagated in a first mode of propagation and the energy traveling the secondary paths be propagated in a second mode of propagation. For example, this can be accomplished by employing transmitter 8 whose power is split and coupled to energy polarizing transducers 9 and 10. For instance, transducer 9 can be arranged to propagate the energy with horizontal polarization and transducer 10 propagating the energy from transmitter 8 with vertical polarization. Therefore, the energy propagated on the primary path has horizontal polarization and the energy propagated on the secondary path has vertical polarization. It is of course not required that the waves identifying the secondary path be vertically polarized and those waves identifying the primary paths be horizontally polarized. The polarizations can be reversed. All that is required is a mode of propagation to enable identification and operation on the signals traveling the two paths.

Antenna 4 includes substantially the same type of transducers 11 and 12 for reception of the energy following the primary paths for application through diplexer 13 to receiver 14 and the reception of the energy following the secondary paths for application to diplexer 15 and hence to receiver 16. The diplexers 13 and 15 are necessary to enable the reception and transmission of energy from the same transducers 11 and 12. This same arrangement is necessary at terminal 1 as is illustrated by diplexers 17 and 18 to enable the transmission and reception of signals coming from the terminal 2 to terminal 1 thereby providing two-way communication. The output of the receivers in each of the terminal stations are coupled to some device, illustrated herein as combiner 19 and 20, to utilize the outputs of receivers 21, 22 and 14, 16, respectively, to achieve a signal which has substantially eliminated any fading effect. It should be pointed out that for the communication from terminal 2 to terminal 1 one half of the transmitted power must be intercepted by reflector 6 and directed toward reflector 5 and hence toward the terminal 1. It has been determined that there is a 3 db loss in the propagation signal level by employing this type of transmission system, since reflector 5 intercepts some of the signal on the primary path.

It should be pointed out that the system hereindescribed suffers the disadvantage of a total of 6 db loss, since in addition to the 3 db loss caused by the plane reflectors, there is a 3 db loss due to the power split requirement in order to provide the two polarized signals. The total loss may be reduced to the nominal 3 db due to power splitting by utilizing a polarized reflector for reflector 6. The polarized reflector must be such as to permit the oppositely polarized signal to pass therethrough and to reflect the polarized signal which is following the secondary path. Hence in the illustration shown polarized reflector 6 must enable the passage without loss of the horizontally polarized wave and must reflect the vertically polarized wave to accomplish the objects of this system.

While we have described above the principles of our invention in connection with specific apparatus, it is to be clearly understood that this description is made only by way of example and not as a limitation to the scope of our invention as set forth in the objects thereof and in the accompanying claims.

We claim:

1. A diversity communication system comprising a first antenna disposed at one end of said system, a second antenna disposed at the other end of said system, a radio wave reflecting surface disposed relative to said first and second antennas to provide primary radio wave paths between said first and second antennas including said first and second antennas and said reflecting surface, and reflecting means disposed adjacent one of said antennas to provide secondary radio wave paths between said first and second antennas including said first and second antennas, said reflecting surface and said reflecting means to achieve diversity advantage.

2. A diversity communication system comprising a first antenna disposed at one end of said system, a second antenna disposed at the other end of said system, a radio wave reflecting surface disposed relative to said first and second antennas to provide primary radio wave paths between said first and second antennas including said first and second antennas and said reflecting surface, and electromagnetic wave directing means disposed adjacent one of said antennas to provide secondary radio wave paths between said first and second antennas including said first and second antennas, said reflecting surface and said wave directing means to achieve diversity advantage.

3. A diversity communication system comprising a first antenna disposed at one end of said system, a second antenna disposed at the other end of said system, and a pair of stationary reflectors disposed adjacent one of said antennas to provide a secondary radio wave path between said first and second antennas to achieve diversity advantage.

4. A diversity communication system comprising a first antenna disposed at one end of said system, a second antenna disposed at the other end of said system, and a pair of plane reflectors disposed adjacent one of said antennas to provide a secondary radio wave path between said first and second antennas to achieve diversity advantage.

5. A diversity communication system comprising a first parabolic antenna disposed at one end of said system, a second parabolic antenna disposed at the other end of said system, a radio reflecting surface disposed in radio wave exchanging relation with said first and second antennas, said first and second antennas and said reflecting surface defining primary radio wave paths between said first and second antennas, and reflecting means disposed adjacent one of said antennas, said first and second antennas, said reflecting surface and said reflecting means defining secondary radio wave paths between said first and second antennas to achieve diversity advantage.

6. A diversity communication system comprising a first parabolic antenna disposed at one end of said system, a second parabolic antenna disposed at the other end of said system, a radio wave reflecting surface disposed in radio wave exchanging relation with said first and second antennas, said first and second antennas and said reflecting surface defining primary radio wave paths between said first and second antennas, and electromagnetic wave directing means disposed adjacent one of said antennas, said first and second antennas, said reflecting surface and said wave directing means defining secondary radio wave paths between said first and second antennas to achieve diversity advantage.

7. A diversity communication system comprising a first parabolic antenna disposed at one end of said system, a second parabolic antenna disposed at the other end of said system, said first and second antennas defining primary radio wave paths therebetween, and a pair of reflectors disposed adjacent one of said antennas to provide secondary radio wave paths between said first and second antennas to achieve diversity advantage.

8. A diversity communication system comprising a first parabolic antenna disposed at one end of said system, a second parabolic antenna disposed at the other end of said system, said first and second antennas defining primary radio wave paths therebetween, and a pair of plane reflectors disposed adjacent one of said antennas to provide secondary radio wave paths between said first and second antennas to achieve diversity advantage.

9. A diversity communication system comprising a first parabolic antenna disposed at one end of said system, a second parabolic antenna disposed at the other end of said system, a first means disposed in each of said antennas to provide radio wave propagation in a first mode of propagation to define primary radio wave paths between said first and second antennas, reflecting means disposed adjacent one of said antennas, and second means disposed in each of said antennas to provide radio wave propagation in a second mode of propagation to define secondary radio wave paths between said first and second antennas to achieve diversity advantage, one of said secondary paths including said reflecting means.

10. A system according to claim 9, wherein said reflecting means reflects energy of said second mode of propagation and passes energy of said first mode of propagations.

11. A diversity communication system comprising a first parabolic antenna disposed at one end of said system, a second parabolic antenna disposed at the other end of said system, a first means disposed in each of said antennas to provide radio wave propagation in a first mode of propagation to define primary radio wave paths between said first and second antennas, electromagnetic wave directing means disposed adjacent one of said antennas, and second means disposed in each of said antenas to provide radio wave propagation in a second mode of propagation to define secondary radio paths between said first and second antennas to achieve diversity advantage, one of said secondary paths including said wave directing means.

12. A system according to claim 11, wherein said wave directing means reflects energy of said second mode of propagation and passes energy of said first mode of propagation.

13. A diversity communication system comprising a first parabolic antenna disposed at one end of said system, a second parabolic antenna disposed at the other end of said system, a first means disposed in each of said antennas to provide radio wave propagation in a first mode of propagation to define primary radio wave paths between said first and second antennas, a pair of reflectors disposed adjacent one of said antennas, and second means disposed in each of said antennas to provide radio wave propagation in a second mode of propagation to define secondary radio wave paths between said first and second antennas to achieve diversity advantage, one of said secondary paths including said reflectors.

14. A system according to claim 13, wherein at least one of said reflectors reflects energy of said second mode of propagation and passes energy of said first mode of propagation.

15. A diversity communication system comprising a first parabolic antenna disposed at one end of said system, a second parabolic antenna disposed at the other end of said system, a first means disposed in each of said antennas to provide radio wave propagation in a first mode of propagation to define primary radio wave paths between said first and second antennas, a pair of plane reflectors disposed adjacent one of said antennas, and second means disposed in each of said antennas to provide radio wave propagation in a second mode of propagation to define secondary radio wave paths between said first and second antennas to achieve diversity advantage, one of said secondary paths including said reflectors.

16. A system according to claim 15, wherein at least one of said reflectors reflects energy of said second mode of propagation and passes energy of said first mode of propagation.

17. A diversity communication system comprising a first parabolic antenna disposed at one end of said system, a second parabolic antenna disposed at the other end of said system, a first means disposed in each of said antennas to provide radio wave propagation in a first polarization to define primary radio wave paths between said first and second antennas, a pair of plane reflectors disposed adjacent one of said antennas, and second means disposed in each of said antennas to provide radio wave propagation in a second polarization orthogonally related to said first polarization to define secondary radio wave paths between said first and second antennas to achieve diversity advantage, one of said secondary paths including said reflectors.

18. A diversity communication system comprising first and second terminal stations disposed in spaced relation, each of said terminal stations including a parabolic antenna, a transmitter, a pair of receivers, transducer means disposed in said antenna in two-way communication coupling relation with said transmitter and said receivers to provide two-way communication in first and second modes of propagation, said first mode of propagation defining primary radio paths between the antennas of said stations, and a pair of reflectors disposed adjacent the antenna of one of said stations to reflect only said second mode of propagation to thereby establish secondary radio wave paths between the antennas of said stations to achieve diversity advantage.

References Cited in the file of this patent

UNITED STATES PATENTS

| | | |
|---|---|---|
| 2,133,615 | Gerhard | Oct. 18, 1938 |
| 2,310,692 | Hansell | Feb. 9, 1943 |